(12) United States Patent
Murai et al.

(10) Patent No.: US 6,196,724 B1
(45) Date of Patent: *Mar. 6, 2001

(54) CYLINDRICAL ROLLER BEARING

(75) Inventors: Takashi Murai; Morio Sorimachi; Yoshio Shoda; Takashi Yamamoto, all of Kanagawa (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,977

(22) Filed: Mar. 31, 1999

(30) Foreign Application Priority Data

Mar. 26, 1998 (JP) .................................................. 11-084322
Mar. 31, 1998 (JP) .................................................. 10-087244

(51) Int. Cl.[7] ...................................................... E04B 5/00
(52) U.S. Cl. ............................................. 384/450; 384/565
(58) Field of Search ................................... 384/450, 565, 384/568

(56) References Cited

U.S. PATENT DOCUMENTS

| | | | |
|---|---|---|---|
| 1,494,392 | 5/1924 | Van Loozen . | |
| 3,268,278 | * 8/1966 | Purdy | 384/568 X |
| 3,732,605 | * 5/1973 | Scheifele | 29/148.4 C |
| 4,403,813 | * 9/1983 | Schaefer | 308/207 |
| 4,655,617 | * 4/1987 | Yasui et al. | 384/465 |
| 5,427,458 | * 6/1995 | Sanchez | 384/450 X |
| 5,538,348 | * 7/1996 | Honda et al. | 384/572 |
| 5,586,826 | * 12/1996 | Kellstrom et al. | 384/450 |
| 5,667,312 | * 9/1997 | Grunze et al. | 384/450 |
| 5,716,146 | 2/1998 | Murai et al. | 384/450 |

FOREIGN PATENT DOCUMENTS

| | | | |
|---|---|---|---|
| 1 268 444 | 5/1968 | (DE) . | |
| 72 37 598 | 10/1972 | (DE) . | |
| 27 12 339 | 9/1977 | (DE) . | |
| 2816319 C2 | 7/1982 | (DE) . | |
| 2447 908 C2 | 9/1983 | (DE) . | |
| 3-67718 | 7/1991 | (JP) | F16C/33/46 |
| 6-58334 | 3/1994 | (JP) | F16C/33/372 |
| 7-127645 | 5/1995 | (JP) | F16C/33/51 |
| 7-243439 | * 9/1995 | (JP) . | |
| 7-305728 | 11/1995 | (JP) | F16C/33/58 |
| 9-291942 | 11/1997 | (JP) . | |
| 11-118008 | * 4/1999 | (JP) . | |

* cited by examiner

Primary Examiner—Sherry Estremsky
(74) Attorney, Agent, or Firm—Sughrue, Mion, Zinn, Macpeak & Seas, PLLC

(57) ABSTRACT

At least the center portion of the contour of a rolling surface of each roller along the direction of an axis is linearly shaped in parallel with the axis, and each of the inclinations of the surface on a pillar side of a pocket of a cage for receiving rollers with respect to the circumferential and radial directions is set to be equal to or less than $1.5/1000$ as large as the length of the roller.

3 Claims, 10 Drawing Sheets

CIRCUMFERENTIAL DIRECTION

CYLINDRICAL ROLLER BEARING

BACKGROUND OF THE INVENTION

1. Field of the Invention

The present invention relates to a cylindrical roller bearing for use in a general machine such as a middle-size electric motor, a large-size electric motor, or the like. Particularly, the present invention relates to an improvement of a cylindrical roller bearing for use in an apparatus requiring both low vibration and low noise.

2. Description of the Related Art

As a technique for reducing both vibration and noise of a cylindrical roller bearing, heretofore, there is a technique in which the contact position between each rolling element and a cage varies in accordance with difference in the guiding method (race guiding or rolling element guiding) of the cage as described, for example, in Japanese Utility Model Publication No. Hei. 3-67718, or a technique in which the contact form is changed as described, for example, in Japanese Patent Publication No. Hei. 7-127645.

Further, in the cage described in Japanese Utility Model Publication No. Hei. 3-67718, particularly the motion of each rolling element in an unloading range is limited to thereby attain the reduction of both vibration and noise of the bearing. That is, since the guiding method of this cage is of the rolling element guiding type, the weight of the cage is loaded on each rolling element in the unloading range. The load becomes a counter force to a centrifugal force acting on the rolling element when the bearing is rotating. Accordingly, the contact pressure between the rolling element in the unloading range and an outer race is reduced. As a result, the vibration of the bearing is suppressed.

Here, in a press cage, it is general that a roller guide surface of the cage is provided from a neighbor of an annular portion and formed in a crowning portion of a rolling surface of each roller as described, for example, in Japanese Utility Model Publication No. Hei. 6-87723, or the like.

Figure 10:
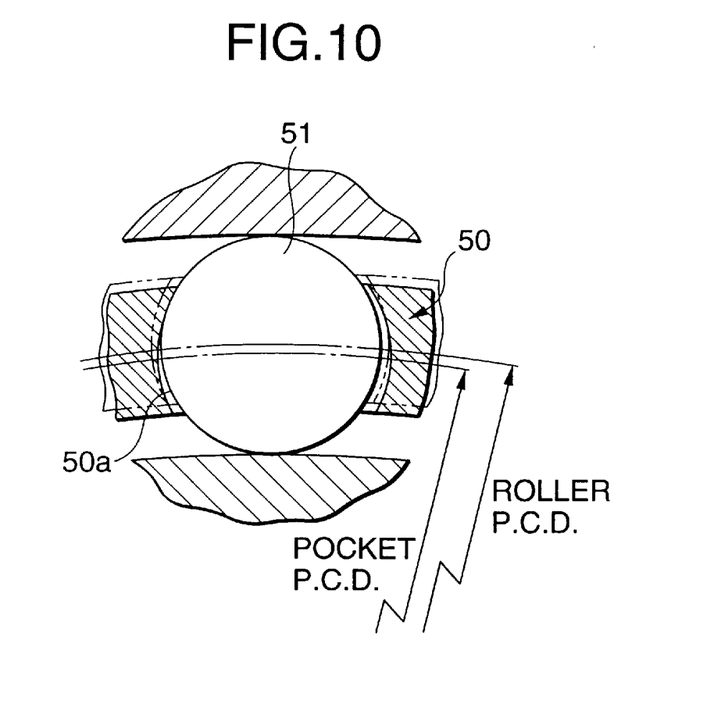
FIG. 10 is a view for explaining a disadvantage in the conventional art.

In the bearing described in Japanese Utility Model Publication No. Hei. 3-67718, however, as shown in FIG. 10, the pitch circle diameter of each pocket 50a of the cage 50 is set to be smaller than the pitch circle diameter of each roller 51. Accordingly, if the bearing is produced so that the difference between the two pitch circle diameters is not made proper, the limitation given by the cage 50 to the roller 51 becomes severe. When the limitation was too severe, the roller 51 and the cage 50 interfered with each other more intensively than necessary so that noise of collision was often produced between the cage 50 and the roller 51 (cage noise).

Further, when the limitation of the cage 50 was severe, the vibration and noise levels of the bearing often varied because the bearing was easily affected by error in individual production of the cage 50.

Further, since the guiding method was limited to the rolling element guiding type, the specifications of the bearing were often limited inevitably.

Incidentally, in the conventional cylindrical roller bearing, the whole contour of a rolling surface of each roller 51 along the direction of an axis of the roller was generally shaped like a composite circular arc crown (partial crowning shape) having a linear portion and a curved portion or like a curved full crown in order to relax edge loading. Accordingly, each roller 51 moving in the unloading range was pressed against a surface (pillar-side surface) of the pocket 50a of the cage 50 facing the roller 51 in the circumferential direction by point contact. The axis of the roller 51 varied easily regardless of presence/absence of inclinations of the pillar-side surface of the pocket 50a with respect to the circumferential and radial directions, so that there was no function to allow the roller 50 to take a stable posture.

SUMMARY OF THE INVENTION

The present invention is designed upon the aforementioned problem and an object of the present invention is to provide a cylindrical roller bearing in which each roller moving in an unloading range is aggressively promoted to move in a geometrically ideal posture and both the inclination (skew) of the roller with respect to the circumferential direction and the inclination (tilt) of the roller with respect to the radial direction are suppressed so that the vibration and noise levels of the bearing can be reduced securely.

In order to achieve the above object, according to a first aspect of the invention, there is provided a cylindrical roller bearing comprising a cage having pockets and rollers received in the pockets, each of the rollers having a rolling surface, a contour of the rolling surface along a direction of an axis of the roller having at least a center portion linearly shaped in parallel with the axis. Each of the pockets is formed so that an inclination of a portion of the pocket opposite to the rolling surface of the roller with respect to a line parallel with a center axis of rotation of the bearing is set to be equal to or less than $1.5/1000$ as large as a length of the roller.

Further, according to a second aspect of the invention, there is provided a cylindrical roller bearing comprising a cage having pockets and rollers received in the pockets, each of the rollers having a rolling surface, a contour of the rolling surface along a direction of an axis of the roller having at least a center portion linearly shaped in parallel with the axis. Each of the pockets is formed so that an inclination of a portion of the pocket opposite to the roller in a circumferential direction is set to be equal to or less than $1.5/1000$ as large as a length of the roller.

Still further, according to a third aspect of the invention, there is provided a cylindrical roller bearing comprising a cage having pockets and rollers received in the pockets, each of the rollers having a rolling surface, a contour of the rolling surface along a direction of an axis of the roller having at least a center portion linearly shaped in parallel with the axis. A portion of the pocket faces the roller in a circumferential direction, and each of the pockets is formed so that inclinations of the portion of the pocket in the circumferential direction and in a radial direction is set to be equal to or less than $1.5/1000$ as large as a length of the roller.

Assume now that a portion of each pocket facing the aforementioned roller in the circumferential direction is referred to as pocket surface. Then, "the pocket surface inclined in the circumferential direction" means a state in which the aforementioned pocket surface is inclined in the circumferential direction relative to a line parallel with the center axis of rotation of the bearing when viewed from the radial direction (see FIG. 6). Further, "the pocket surface inclined in the radial direction" means a state in which the aforementioned pocket surface is inclined in the radial direction relative to a line parallel with the center axis of rotation of the bearing when viewed from the circumferential direction (see FIG. 5).

Figure 11:
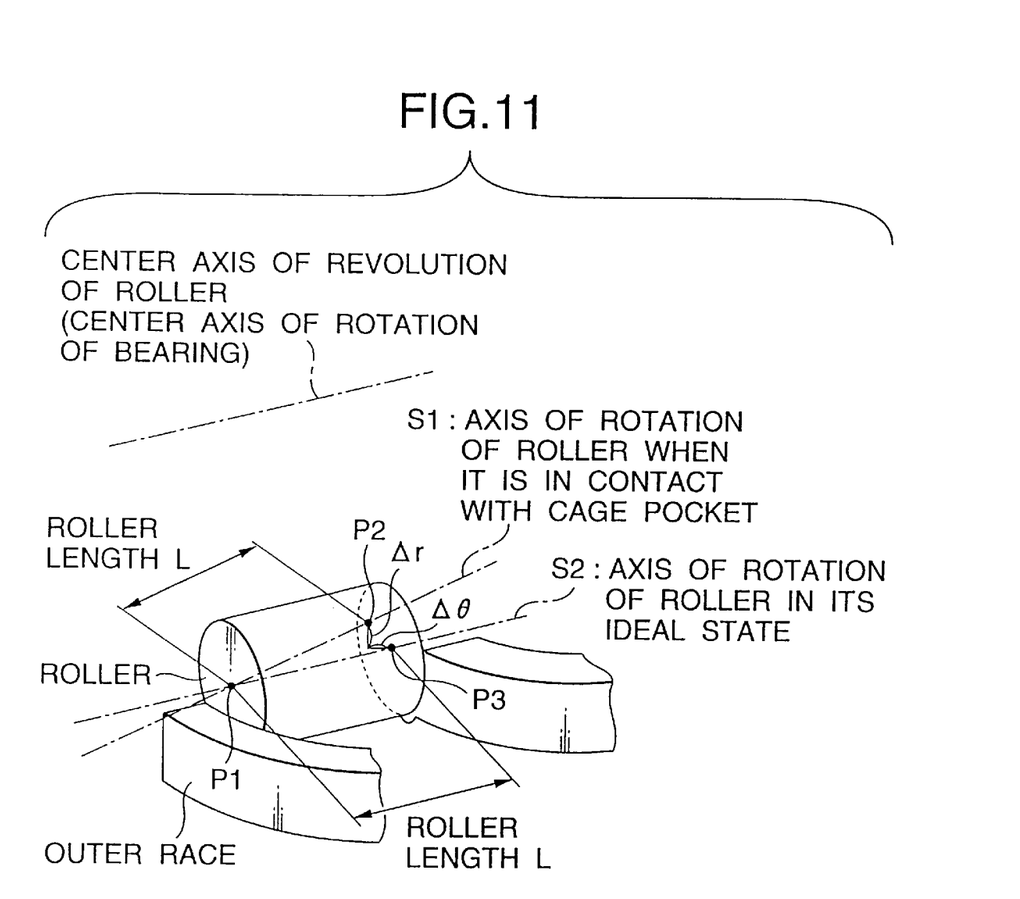
FIG. 11 is a view for explaining falling of the roller with respect to the pocket surface.

Further, when an unloaded roller comes into linear contact with a pocket surface over the axial direction so that the posture of the roller is limited by the pocket surface in the case where the aforementioned pocket surface is inclined in the circumferential or radial direction, as shown in FIG. 11, a line S1 formed by the axis of rotation of the roller when its posture is limited as described above and a line S2 (parallel with the center axis of rotation of the bearing) formed by the axis of rotation of the roller when the bearing makes a geometrically ideal motion (in a state in which the axis of rotation of each roller becomes parallel with the center axis of revolution of rollers (the center axis of rotation of the bearing)) intersect each other, that is, the roller is fallen down from its ideal posture. With respect to points P2 and P3 which are taken along the lines S1 and S2 respectively so as to be far from a point P1 of the aforementioned intersection by the roller length (L), the offset quantity $\Delta\theta$ viewed from the radial direction is equivalent to the quantity of falling of the roller in the circumferential direction, that is, to the quantity of falling generated in the aforementioned roller mainly by the circumferential inclination of the pocket surface relative to the roller length. Further, with respect to the aforementioned two points P2 and P3, the offset quantity $\Delta r$ viewed from the circumferential direction is equivalent to the quantity of falling of the roller in the radial direction, that is, to the quantity of falling generated in the aforementioned roller mainly by the radial inclination of the pocket surface relative to the roller length.

Here, the setting of the circumferential and radial inclinations of the pocket surface can be achieved, for example, by adjusting the circumferential and radial inclinations (falling) of each pillar of the cage. It is a matter of course that the setting is not limited to this manner and but the setting may be achieved by machining the pocket surface per se without any inclination of the pillar.

According to the present invention, a linear portion is provided in the contour of the rolling surface of each roller. Accordingly, if the whole of the linear portion is pressed against the pocket, that is, if the linear portion is pressed so as to come into linear contact with the pocket in the axial direction, unnecessary fluctuation is reduced, so that the posture of the roller in the unloading range is adjusted automatically to a desired posture by the pocket surface. That is, the roller can be guided securely by the pocket surface (pillar-side surface) of the cage pocket facing the roller in the circumferential direction, so that the rotating posture of the roller is stabilized. As a result, the roller guided by the cage in the unloading rage is kept rotating on its own axis and making revolution stably.

The reason why each of the aforementioned inclinations is set to be equal to or less than $1.5/1000$ as large as the roller length is as follows. As explained in examples which will be described later, it was confirmed that the sound pressure level is rapidly improved by setting each of the inclinations to be equal to or less than $1.5/1000$ as large as the roller length (see FIGS. 7 and 8).

Here, it is generally preferable that each roller which is a rolling element rotates on its own axis and makes revolution in an ideal posture in which the axis of rotation of each roller becomes parallel with the center axis of revolution of rollers (the center axis of rotation of the bearing). Pay now attention to the relation between the roller and the cage. Then, there is a relation in which the roller in the loading range presses the cage whereas the roller in the unloading range is pressed, on the contrary, by the cage.

In the aforementioned relation, the roller in the loading range makes a motion in a posture near the ideal posture (in which the axis of rotation of each roller is parallel with the center axis of revolution of rollers (the center axis of rotation of the bearing)) so that the posture is not limited by the pocket surface of the cage on the basis of restriction by the races, whereas the posture of the cage pressed by the roller is determined on the basis of the geometrical contact relation between the rolling surface of the roller and the pocket surface being in contact with the rolling surface of the roller. On the contrary, the roller in the unloading range is pressed by the pocket surface of the cage so that the posture of the roller is limited by the pocket surface.

Accordingly, even in the case where a linear portion is provided in the contour of the rolling surface of each roller to bring the rolling surface into linear contact with the pocket surface to thereby stabilize the posture of the roller in the unloading range, the whole of the cage is apt to make revolution while inclined with respect to the center axis of revolution (the center of rotation of the bearing) if each pocket surface of the cage is inclined in the circumferential or radial direction. Accordingly, the roller in the unloading range roller is guided by the inclined cage, so that the roller is forced to have a skew and a tilt. As a result, the roller makes an unstable motion. This is a cause of both vibration and noise. Of the bad influences, the influence of the circumferential inclination is more severe. Incidentally, it is apparent from the above description that the inclination of the pocket surface in the circumferential and radial directions is not always just equal to the quantity of circumferential and radial falling of the roller having its posture limited by the cage.

From the aforementioned point of view, in the present invention, there is obtained a new knowledge that the sound pressure level is rapidly improved when each of inclinations of the pocket surface in the circumferential and radial directions, especially the inclination in the circumferential direction is suppressed, particularly when the inclination is suppressed to be equal to or less than $1.5/1000$ as large as the roller length. Accordingly, each of the inclinations of the pocket surface in the circumferential and radial directions is limited to be equal to or less than $1.5/1000$ as large as the roller length.

In this case, the inclination of the pocket surface in the circumferential direction is just a direct cause of circumferential falling of the posture of the roller guided by the cage in the unloading range. Accordingly, as described in the second aspect of the invention, particularly suppressing the inclination in at least circumferential one of the circumferential and radial directions to be equal to or less than $1.5/1000$ as large as the roller length is effective for suppressing the skew, or the like, of the roller.

Further, in the case where the contour of the pocket surface along the radial direction is linearly shaped, the inclination in the radial direction becomes zero inevitably. Accordingly, the bearing may be designed so that the inclination of the pocket surface only in the circumferential direction is suppressed to be equal to or less than $1.5/1000$ as large as the roller length as described in the second aspect of the invention.

Still further, in the case where the contour of the pocket surface along the radial direction is shaped like a circular arc, it is difficult to specify the contact position between the pocket surface and the rolling surface of the roller if some inclination in the radial direction is present in the pocket surface. On the assumption of the roller guiding type, however, the roller in the unloading range always comes into contact with the outer circumferential side of the pocket securely. That is, it is considered that the roller in the unloading state is guided while kept in the unloading state if the inclination in the radial direction is present in this portion. Accordingly, it is considered that the inclination in the radial direction also has a bad influence on the behavior of the roller in the unloading range though the bad influence of the inclination in the radial direction is less than the bad influence of the inclination in the circumferential direction.

Accordingly, in the case where not only the inclination in the circumferential direction but also the inclination in the radial direction are limited to be equal to or less than $1.5/1000$ as large as the roller length as described in the third aspect of the invention, the suppression of the skew, or the like, can be performed more effectively.

Further, according to the first aspect of the invention, with a line parallel with the center axis of rotation of the bearing as a reference, the inclination is set to equal to or less than $1.5/1000$ as large as a length of the roller. Under this structure, there is achieved the same effect as in the case that the both inclinations in the circumferential and radial directions are set to equal to or less than $1.5/1000$ as large as a length of the roller.

Further, in the case where the contour of the pocket surface along the radial direction is shaped like a circular arc, it can be considered that the influence on the falling of the roller occurs by the difference of radii of the curvature of the circular arc. However, the inclination of the pocket surface is set equal to or less than $1.5/1000$ as large as a length of the roller in the first aspect of the invention while taking the influence of the circular arc into consideration.

Figure 14:
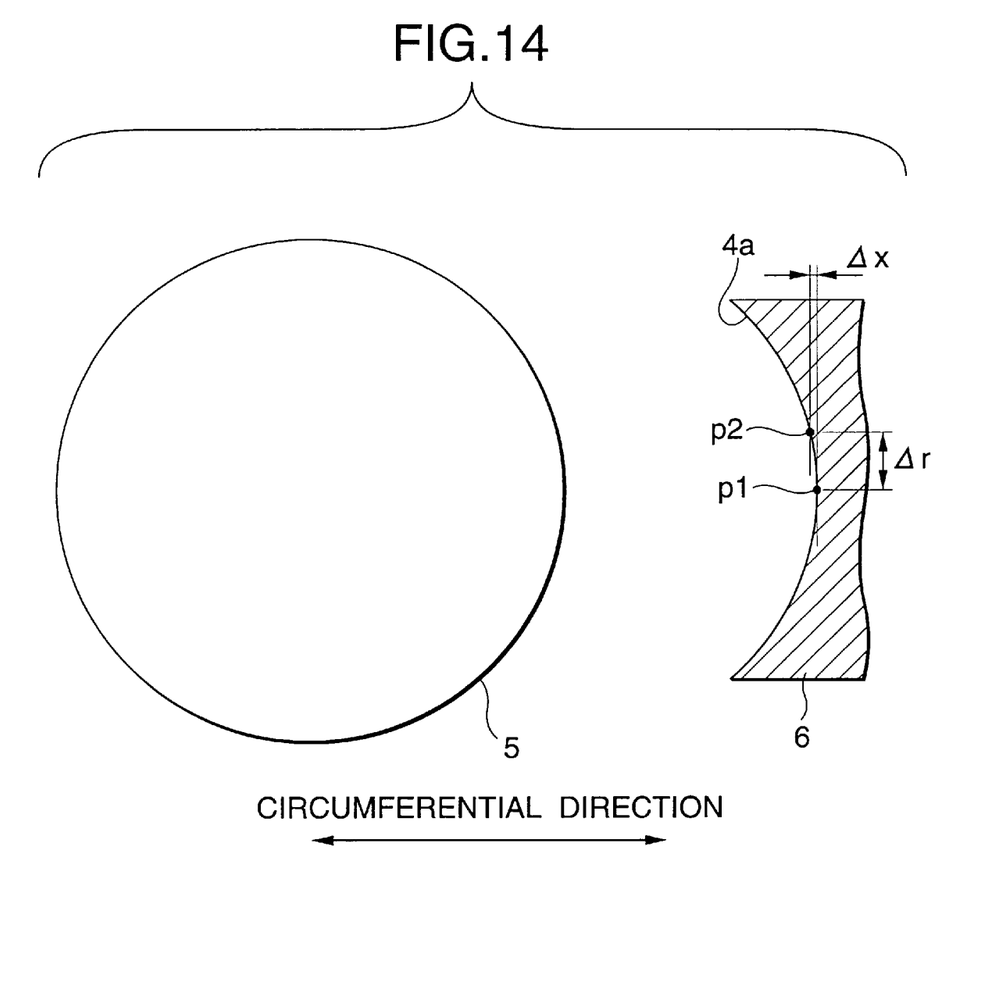
FIG. 14 is a view for explaining an action according to the present invention.

For example, there is explained a case where the pocket surface $4a$ is inclined with $\Delta r$ only in the radial direction with reference to FIG. 14 showing the example having no inclination in the radial direction. Assuming that the pocket surface $4a$ faces a line parallel with the center axis of rotation of the bearing at the position P1 at an end portion in the axial direction, the pocket surface $4a$ faces the line at the position P2 at a position far from the end portion by the roller length in the axial direction. That is, substantial $\Delta x$ inclination in the circumferential direction with respect to the pocket surface $4a$ is generated corresponding to radius of curvature in the radius direction of the pocket surface $4a$. In the first aspect of the invention, the inclination of the pocket surface $4a$ is set equal to or less than $1.5/1000$ as large as a length of the roller while taking the substantial inclination in the circumferential direction into consideration.

That is, according to the first aspect of the invention, the aforementioned influence by the radius of curvature of the circular arc in the radius direction is taken into consideration, so the substantial inclination of the pocket surface $4a$ can be set equal to or less than $1.5/1000$ as large as a length of the roller.

Incidentally, in the case where, with respect to rolling of the roller, not only the center portion but also the whole of the counter of the rolling surface along the axial direction is linearly shaped, not only the aforementioned function is promoted so that each roller is guided more securely by the pillar-side surface of the cage pocket but also the roller per se is hardly affected by a force which is generated by a lubricant (oil, grease, or the like) on the race surfaces and which disturbs the posture of the roller.

That is, when the contour of the whole rolling surface of the roller is linearly shaped, an oil film is apt to be formed evenly on the roller in the axial direction and the effect of suppressing the skew, etc. is enhanced so that each roller can rotate on its own axis and can make revolution in a stabler posture.

By these functions, in accordance with the present invention, both vibration and noise of the bearing caused by the change of the roller posture can be suppressed when each roller is rotating.

Features and advantages of the invention will be evident from the following detailed description of the preferred embodiments described in conjunction with the attached drawings.

DETAILED DESCRIPTION OF THE PREFERRED EMBODIMENTS

An embodiment of the present invention will be described bellow with reference to the drawings.

Figure 1:
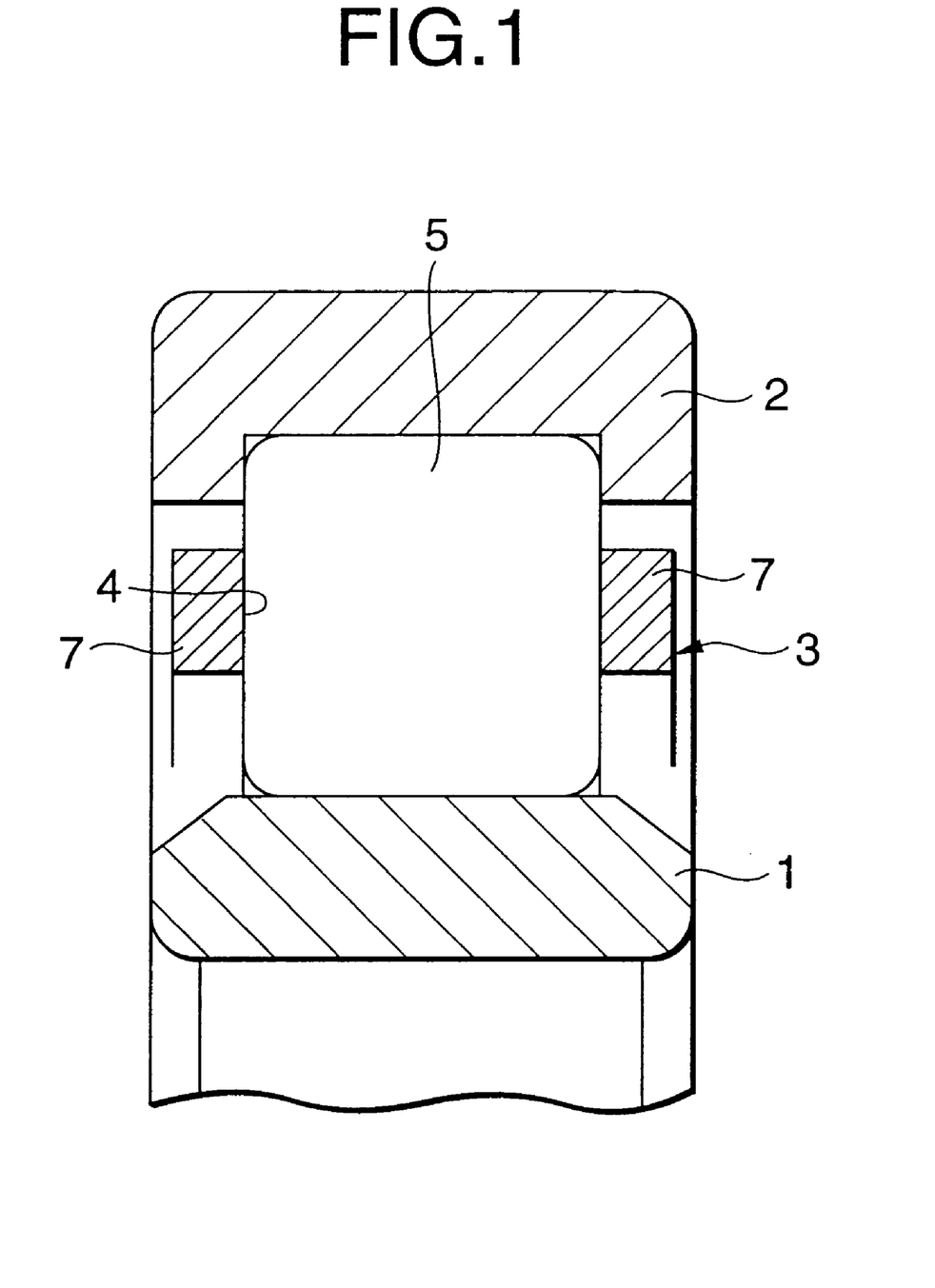
FIG. 1 is a sectional view of a bearing according to an embodiment of the present invention, viewed from the circumferential direction.
Figure 2:
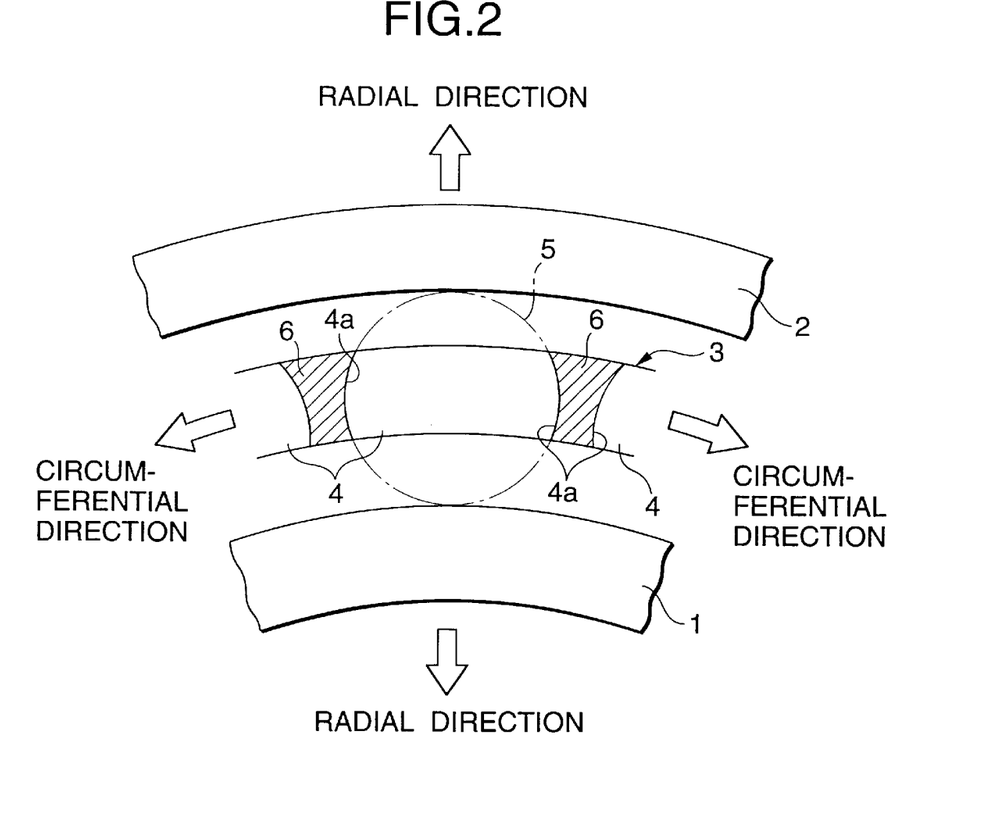
FIG. 2 is a partly enlarged view of the bearing according to the embodiment of the present invention, viewed from the axial direction.

The configuration of the cylindrical roller bearing according to the present invention is as follows. As shown in FIG. 1 which is a sectional view viewed from the circumferential direction and as shown in FIG. 2 which is a partly enlarged view viewed from the axial direction, a ring-shaped cage 3 is disposed between an inner race 1 and an outer race 2. Pockets 4 are provided in the cage 3 at predetermined intervals in the circumferential direction. Cylindrical rollers 5 are disposed in the pockets 4 respectively.

For example, the cage 3 is a machined cage of brass. In the aforementioned drawings, the reference numeral 6 designates pillars of the cage; 7, side plates extending in the circumferential direction; and $4a$, surfaces of the pockets 4 which face the rollers 5 in the circumferential direction (surfaces of the pillars 6 side).

Figure 3:
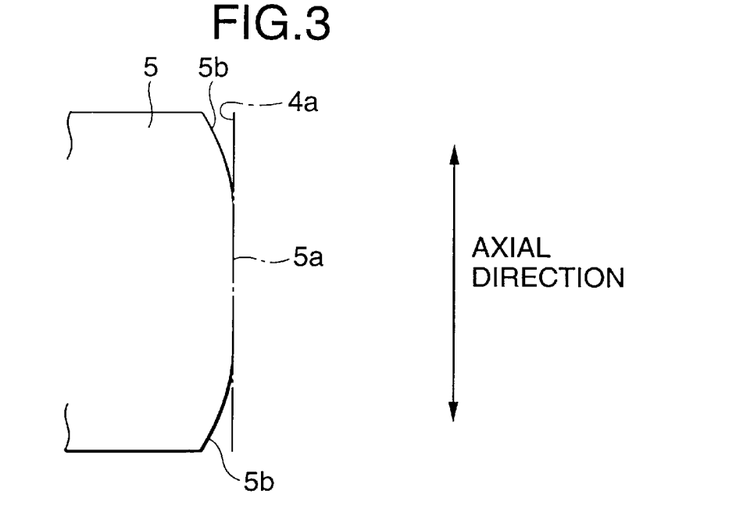
FIG. 3 is a view for explaining the contour of a roller according to the embodiment of the present invention.
Figure 4:
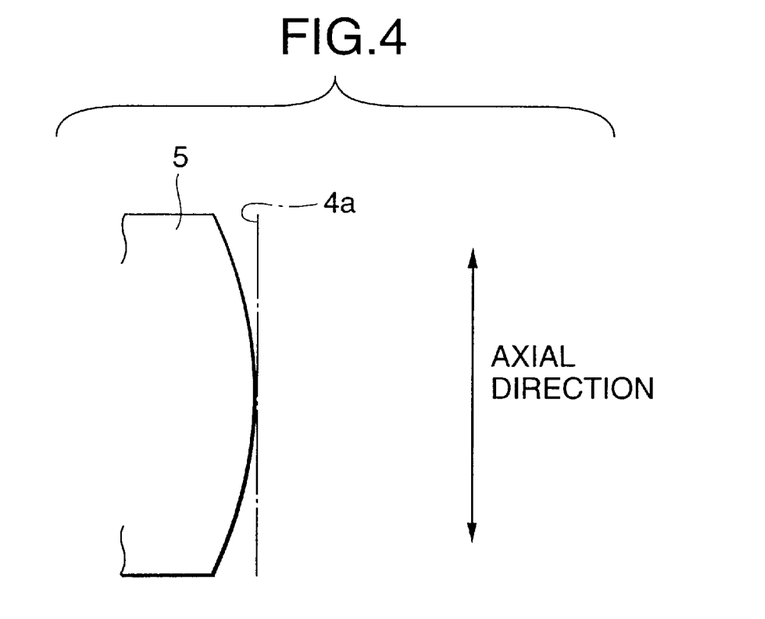
FIG. 4 is a view for explaining the contour of a conventional roller.

The contour of the rolling surface of each of the cylindrical roller S is formed so that its center portion is shaped linearly in parallel with the axis to form a straight portion 5a and each of its left and right sides 5b is shaped like a crown (or tapered) as shown in FIG. 3. That is, the contour of the rolling surface of each of the cylindrical rollers 5 in this embodiment is formed so that the center portion of the full crown shape as shown in FIG. 4 is cut to be flattened.

Further, the inclination of each of the pillars 6 is adjusted so that, relative to the circumferential and radial directions, the inclination of a portion of each pocket 4 of the cage 3 facing the roller 5 in the circumferential direction, that is, the inclination of each surface 4a (on the pillar 6 side) against which the roller 5 is pressed, is set to be equal to or less than $1.5/1000$ as large as the roller length L.

Figure 5:
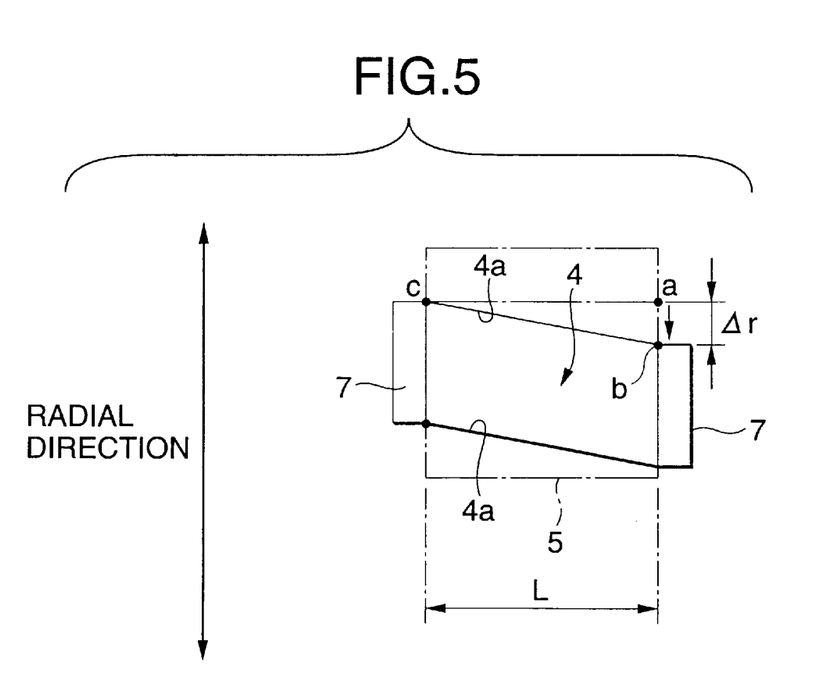
FIG. 5 is a view from the circumferential direction for explaining the inclination in the radial direction.
Figure 6:
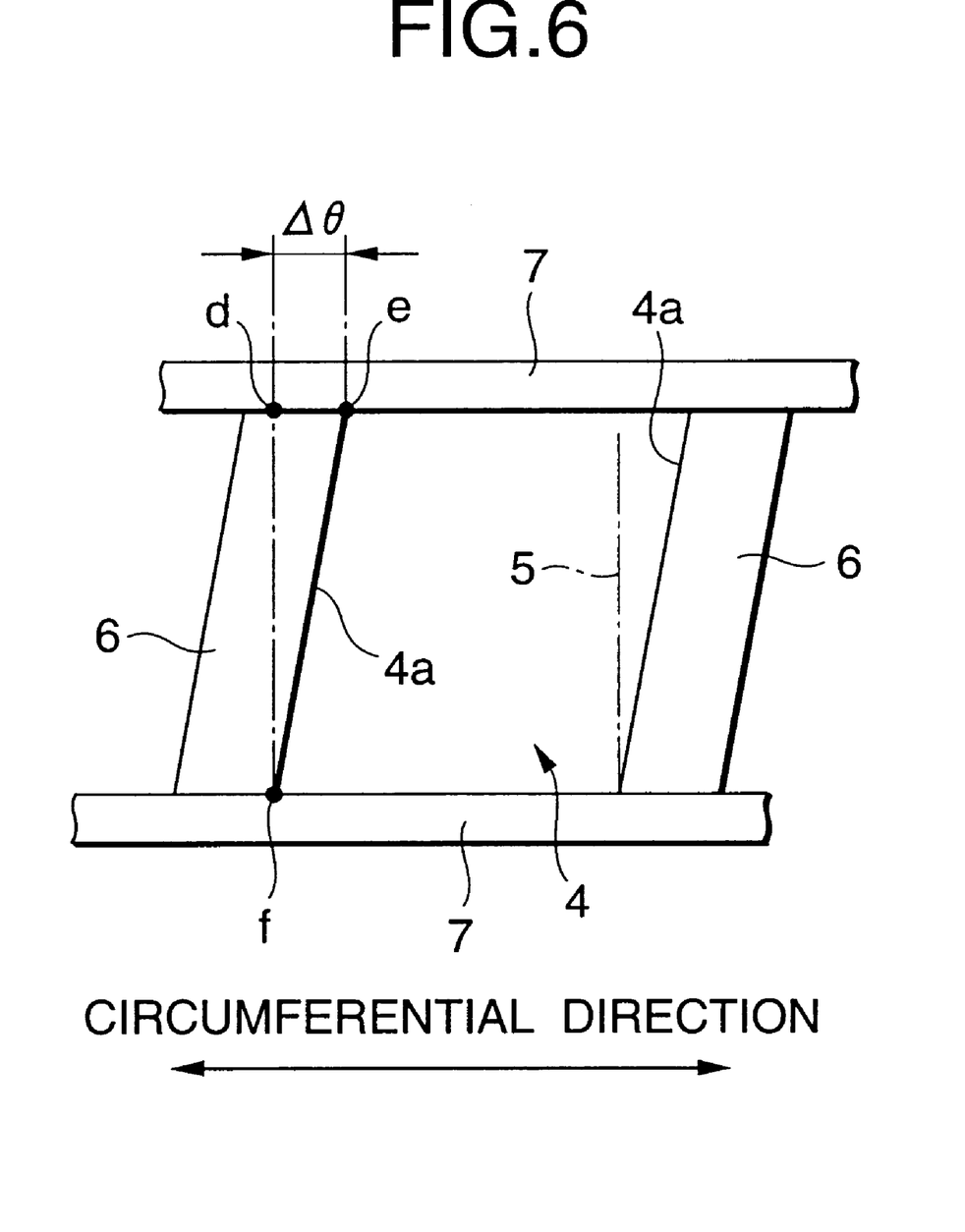
FIG. 6 is a view from the radial direction for explaining the inclination in the circumferential direction.

That is, assume that Δr represents the radial inclination quantity of each of all the pillars 6 (the length of a segment ab which represents the quantity of radial displacement in the position of the roller length L of each pocket 4 from a reference point c on a cage side plate 7 in the cage pocket 4) as shown in FIG. 5 which is a typical view viewed from the circumferential direction, and that Δθ represents the circumferential inclination quantity of each of all the pillars 6 (the length of a segment de which represents the quantity of circumferential displacement in the position of the roller length L of each pocket 4 from a reference point f on a cage side plate 7 in the cage pocket 4) as shown in FIG. 6 which is a typical expansion plan view viewed from the radial direction. Then, machining is performed so that each of the radial and circumferential inclination quantities Δr and Δθ is set to be equal to or less than $1.5/1000$ as large as the roller length L.

Here, the above radial and circumferential inclinations can be confirmed, for example, by measuring each of the relative offset amounts in the radial direction and in the circumferential direction between right and left side plates 7, 7 facing in the axial direction.

As shown in FIG. 3, in the aforementioned cylindrical roller bearing, the whole of the straight portion 5a in the rolling surface of each of the cylindrical rollers 5 is pressed relatively so as to come in contact with the surface 4a of the pocket 4 on the pillar 6 side, so that the roller 5 rotates while the posture of the roller 5 is adjusted automatically so as to be a posture along the surface 4a of the pocket 4 against which the roller 5 is pressed. Further, because the inclination of the surface 4a of the pocket 4 against which the roller 5 is pressed is suppressed to be equal to or less than $1.5/1000$ as large as the roller length L as described above, the roller 5 is always controlled to reduce the inclination. Accordingly, in the unloading range, the roller 5 moves in a stable rotating posture.

As a result, both vibration and noise of the bearing caused by the change of the roller posture can be suppressed when the roller is rotating.

Here, as the length of the straight portion 5a increases, the rolling surface portion of the roller 5 which is guided while being brought into contact with the pocket 4 increases so that the rotating posture of the roller 5 is made stabler.

Further, in the straight portion 5a in the rolling surface of the roller 5, an oil film along the axial direction is apt to be made uniform. Accordingly, the influence of the force which is given to the roller 5 per se from the lubricant (oil, grease, or the like) on the race surfaces and which may disturb the posture of the roller 5 is reduced.

By these effects, both vibration and noise of the bearing caused by the change of the posture of the roller 5 can be suppressed when the roller 5 is rotating.

Further, according to the present invention, the limitation from the cage 3 is transmitted to the roller 5 securely and reasonably. Accordingly, it is a matter of course that both increase of torque of the bearing and abnormal abrasion of the cage 3 are prevented. Further, the present invention can be applied to the bearing specifications widely because there is no limitation caused by the guiding method of the cage 3.

Although the aforementioned embodiment has shown the case where a machined cage of brass is used as the cage 3, it is a matter of course that a plastic cage, a press cage, or the like, may be used. The material and shape of the cage are not limited specifically. Further, the form of the cage is not limited to the integrated or separate type. The low-vibration and low-noise effect can be obtained within the scope of the present invention.

Although the sectional shape of each of the pillars 6 in the cage 3 in this embodiment when viewed from the axial direction is made to be a circular arc so as to embrace the roller 5 along the radial direction, it is a matter of course that the sectional shape is not limited to such a shape specifically and the same effect can be obtained even in any other shape.

Particularly in the case where a pillar-side portion of the cage pocket 4 which is in contact with the roller 5 is linearly shaped in the radial direction, the substantial radial inclination of the pocket surface 4a is eliminated (becomes zero) regardless of the size of the radial inclination Δr of each pillar constituting the pocket surface 4a which is in contact with the roller 5. Accordingly, if only the circumferential inclination Δθ of the pillar is adjusted to be equal to or less than $1.5/1000$, the effect of the present invention can be obtained securely. That is, the cage having the aforementioned effect can be machined easily.

Further, in the case where the sectional shape of each pillar 6 of the cage 3 in this embodiment is like a circular arc embracing the roller 5 along the radial direction when viewed from the axial direction, the inclination of a portion of the cage pocket 4 which is in contact with the roller 5 can be set to $1.5/1000$ with a reference of a line parallel with the center axis of rotation of the bearing.

In this case, a substantial inclination is calculated by taking the radius of curvature at the portion (pocket surface) of the cage pocket 4 which is in contact with the roller 5 into consideration. This substantial inclination is set equal to or less than $1.5/1000$.

In this occasion, the circumferential inclination has a bad influence on the falling of the roller 5 more securely. Accordingly, in the case where only one of the circumferential and radial inclinations is to be suppressed, the circumferential inclination is preferably suppressed.

Incidentally, in the case where the sectional shape of each pillar 6 of the cage 3 is like a circular arc embracing the roller 5 along the radial direction when viewed from the axial direction, it may be considered that a portion of the pocket 4 of the cage 3 facing the roller 5 in the circumferential direction, that is, the surface 4a (surface on the pillar 6 side) against which the roller 5 is pressed, is aggressively inclined in the circumferential and radial directions and the relation between the quantities of inclination in the circumferential and radial directions is adjusted so that the circumferential inclination of the contour along the axial direction in a portion being in contact with the rolling surface of the roller is designed to be equal to or less than $1.5/1000$ as large as the roller length to thereby obtain the same function as in the present invention. There is, however, a problem that the direction of rotation of the bearing is limited to one direction or machining of the cage is troublesome.

Incidentally, the invention according to Japanese Patent Publication No. Hei. 9-291942 maybe used in combination with each of all the embodiments as follows. Let D be the diameter of a cage circumferential surface which is one of the inner and outer circumferential surfaces of an axial end portion of the cage 3. Let H be the annular gap between the aforementioned cage circumferential surface and a race circumferential surface which is corresponding one of the brim inner diameter surface of the outer race 2 and the brim outer diameter surface of the inner race 1. Let A be the axial length of the aforementioned cage circumferential surface. Let B be the axial length of the aforementioned race circumferential surface. Then, the cage 3 may be configured to satisfy the relations $1.5 \times 10^{-3} \cdot D \leq H \leq 9.0 \times 10^{-3} \cdot D$ and $0.6 \leq A/B \leq 1.0$ to thereby attain both the suppression of squeaking noise and the reduction of the sound pressure level of the cage noise more greatly.

A first example about a rotation sound evaluation test performed to confirm the operation and effect of the present invention will be described below.

In the first example, the test was performed on a cylindrical roller bearing of NU218. Here, with the main size of the bearing, the (inner race) inner diameter, the (outer race) outer diameter and the width of the bearing were $\phi$90 mm, $\phi$160 mm and 30 mm, respectively.

Each roller 5 which was a rolling element had a diameter of $\phi$19 mm and a length L of 20 mm. With respect to the shape of the rolling surface, two types of rolling surface shapes were prepared as follows. One type A (referred to as partial crowning shape) was formed so that the axial center portion of the roller 5 was formed into a straight portion 5a (about a half of the roller length) and that crowning was applied to opposite end sides 5b. The other type B was formed into a full crowning shape in which crowning was applied to the whole of the roller length.

The cage 3 was a machined type cage (roller guiding method) of brass. With respect to the radial and circumferential inclination quantities $\Delta r$ and $\Delta \theta$ of the pillar-6-side surface 4a of each of the pockets 4 in the cage 3, four types of cages were prepared, that is, cages in which each of ab and de in FIGS. 5 and 6 was equal to or less than about 60 microns, cages in which each of ab and de was equal to or less than about 40 microns, cages in which each of ab and de was equal to or less than about 25 microns, and cages in which each of ab and de was equal to or less than about 10 microns, were prepared. Here, the inclination quantities of the pillars 6 were measured with a three-dimensional measuring instrument.

In the test, one and the same inner race 1 and one and the same outer race 2 were used in common to all bearings. While the aforementioned two types of rollers 5 different in rolling surface shape and the aforementioned four types of cages 3 were used in combination, the test was performed two times per combination (16 times in total).

The test conditions were as follows. Incidentally, sound evaluation was based on the sound pressure level value which was obtained by using a frequency analyzer (FFT) when sound produced at the time of rotation of the rollers was collected by a microphone.

Conditions

Rotational Speed: 1200 rpm

Lubrication: grease lubrication

Radial Load: 150 kgf

Measurement Frequency Range: 0–10 kHz

Figure 7:
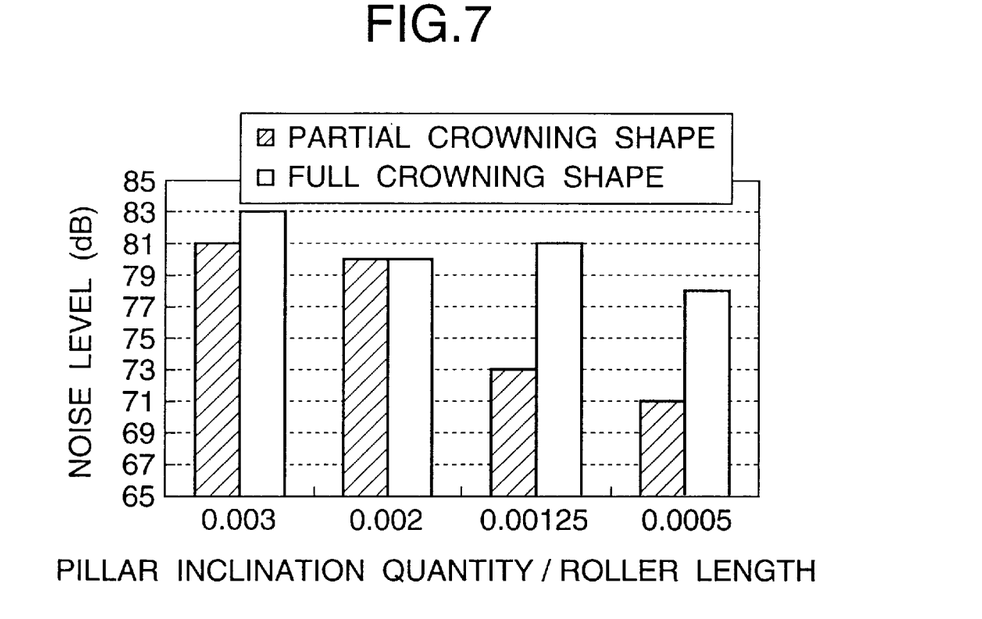
FIG. 7 is a graph showing the sound pressure level of the bearing based on the ratio of the inclination quantity of each pillar of the cage to the roller length in a first example.

Results of the test were shown in FIG. 7. The horizontal axis shows the ratios ($\Delta r/L$, $\Delta \theta/L$) of the inclination quantities of the cage pillar 6 to the roller length L. The vertical axis shows the averaged sound pressure level at the time of testing in comparison of the case where the roller type A was used with the case where the roller type B was used.

It is apparent from FIG. 7 that, in the case where the rollers 5 were of the A (partial crowning) shape type, the sound pressure level increased rapidly when the inclination quantity ($\Delta r$, $\Delta \theta$) of each pillar 6 of the cage 3 was changed from 25 microns ($\Delta r/L$, $\Delta \theta/L \approx 0.00125$) to 40 microns ($\Delta r/L$, $\Delta \theta/L \approx 0.002$).

On the other hand, it is apparent that, in the case where rollers 5 of the B (full crowning) shape type were assembled, the sound pressure level was not changed so much in accordance with the inclination quantity ($\Delta r$, $\Delta \theta$) of each pillar 6 of the cage, that is, the sound pressure level was still high even though the inclination quantity of the pillar 6 was set to be as small as that in the present invention.

Further, in the case where rollers 5 of the B shape type were assembled, the sound pressure level at the time of testing was largely fluctuated (not shown).

As described above, in the cylindrical roller bearing in which rollers 5 each having a straight portion 5a as a portion of the rolling surface of the roller are assembled, it is apparent that the level of sound pressure produced can be reduced in accordance with the inclination quantity ($\Delta r$, $\Delta \theta$) of each pillar 6 of the cage 3.

Further, it is apparent from this test that the effect of reducing the sound pressure level can be obtained particularly when both the ratios ($\Delta r/L$, $\Delta \theta/L$) of the inclination quantities ($\Delta r$, $\Delta \theta$) of each pillar 6 of the cage to the roller length L are set to be equal to or less than about 0.0015 (experimentally, the sound pressure level is largely reduced when each of the ratios is 0.00125).

The reason for the aforementioned fact can be considered as follows. In the bearing in which rollers 5 each having a straight portion 5a in its rolling surface were assembled, both the skew of each roller 5 with respect to the circumferential direction and the tilt of the roller 5 with respect to the radial direction could be suppressed. Accordingly, rollers 5 guided by the cage 3 in the unloading range could rotate on their own axes and make revolution in a stable posture, so that the sound pressure level of the bearing was reduced.

On the contrary, in rollers 5 each having a full crowning shape in its rolling surface, the rollers 5 in the unloading range could hardly rotate on their own axes and hardly make revolution in a stable posture because there was no straight portion even in the case where the inclination quantities ($\Delta r$, $\Delta \theta$) of each pillar 6 of the cage 3 guiding the rollers were set to be smaller. It can be therefore considered that the sound pressure level of the bearing was not reduced. It can be further considered that the sound pressure level at the time of testing largely fluctuated.

Figure 12:
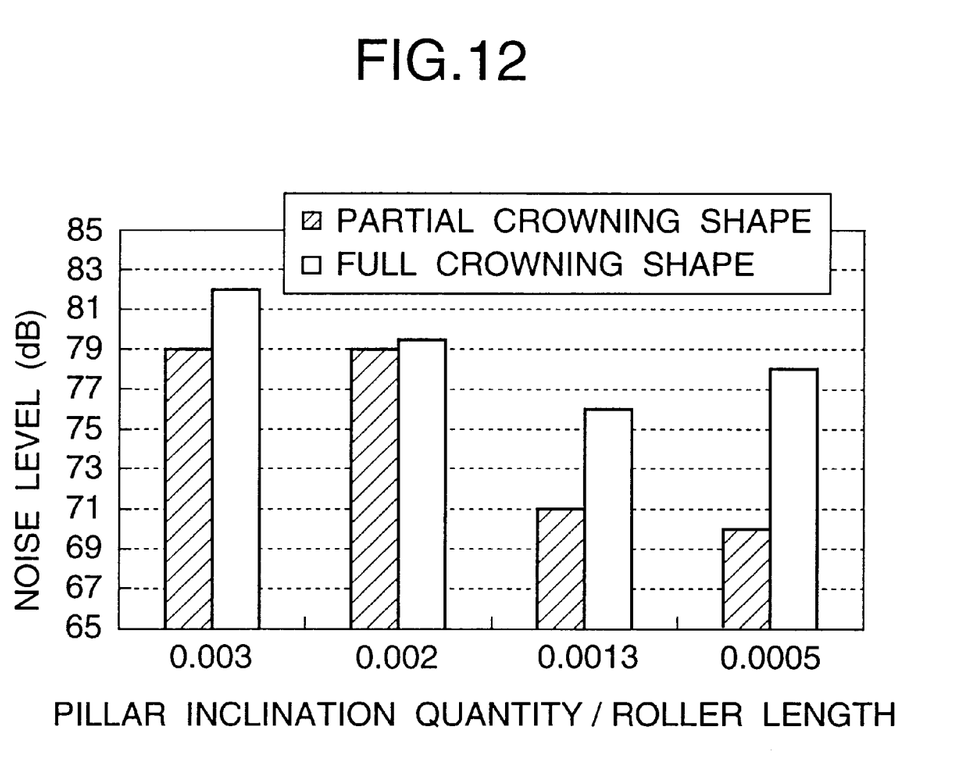
FIG. 12 is a graph showing a result of the another test with respect to the first example.

Further, another test was executed under the same condition described above except that lubricating oil was used for lubrication in place of grease lubrication. FIG. 12 shows its result.

It is understood from FIG. 12 that the same test result (reduction of sound pressure level or the like) can be obtained by the bearing using a cage according to the present invention not depending on the kinds of the lubrications, for example, even if lubricating oil was used for lubrication.

Further, it is understood from two graphs on the right side (present invention) in each of FIGS. 7 and 12 that it is possible to reduce the difference of the sound pressure levels occurred by difference of the kinds of lubrications in a state that at least one straight portion 5a is provided in the rolling surface of the roller 5 based on the present invention.

Incidentally, though detail is not be described here, this example is carried out as follows. Let D be the diameter of a cage circumferential surface which is one of the inner and outer circumferential surfaces of an axial end portion of the cage. Let H be the annular gap between the aforementioned cage circumferential surface and a race circumferential surface which is corresponding one of the brim inner diameter surface of the outer race and the brim outer diameter surface of the inner race. Let A be the axial length of the aforementioned cage circumferential surface. Let B be the axial length of the aforementioned race circumferential surface. Then, the relations H=5.0×10$^{-3}$ and A/B=0.9 was satisfied.

Further, though not shown, comparison was made with a cage (conventional machined cage) in which the values of H and A/B were out of the scope of claims. As a result, the effect of reducing the sound pressure level (inclusive of cage noise) by about 3 dB on average was obtained.

Incidentally, the cage used in the confirmation evaluation test in this time was of the integral roller guiding type which was able to be produced so that accuracy in falling of each pillar of the cage was relatively optional.

A second example will be described below.

In the second example, a test was performed on a cylindrical roller bearing of NU322 having a relatively large size.

With the main size of the bearing, the (inner race) inner diameter, the (outer race) outer diameter and the width of the bearing were φ110 mm, φ240 mm and 50 mm, respectively.

Each cylindrical roller 5 had a diameter of φ32 mm and a length L of 32 mm in the same manner as in the first example. With respect to the shape of the rolling surface, two types of rolling surface shapes were prepared as follows. One type A (referred to as partial crowning shape) was formed so that crowning was applied to opposite end sides of each roller while a straight portion (about a half of the roller length) is left in the axial center portion of the roller. The other type B was formed into a full crowning shape in which crowing was applied to the whole of the roller length.

The cage 3 was a machined type cage (outer race 2 guiding method) of brass. With respect to the radial and circumferential inclination quantities Δr and Δθ of the surface 4a on the pillar 6 side of each of the pockets 4 in the cage 3, four types of cages 3 were prepared, that is, cages in which each of ab and de in FIGS. 5 and 6 was equal to or less than about 90 microns, cages in which each of ab and de was equal to or less than about 70 microns, cages in which each of ab and de was equal to or less than about 50 microns, and cages in which each of ab and de was equal to or less than about 30 microns, were prepared. Here, the inclination quantities of the pillar 6 were measured with a three-dimensional measuring instrument.

In the test, one and the same inner race 1 and one and the same outer race 2 were used in common to all bearings. While the aforementioned two types of rollers 5 different in rolling surface shape and the aforementioned four types of cages 3 were used in combination, the test was performed two times per combination (16 times in total). The test conditions were as follows. Incidentally, sound evaluation was performed in the same manner as in the first example.

Conditions

Rotational Speed: 1000 rpm

Lubrication: grease lubrication

Radial Load: 150 kgf

Measurement Frequency Range: 0–10 kHz

Figure 8:
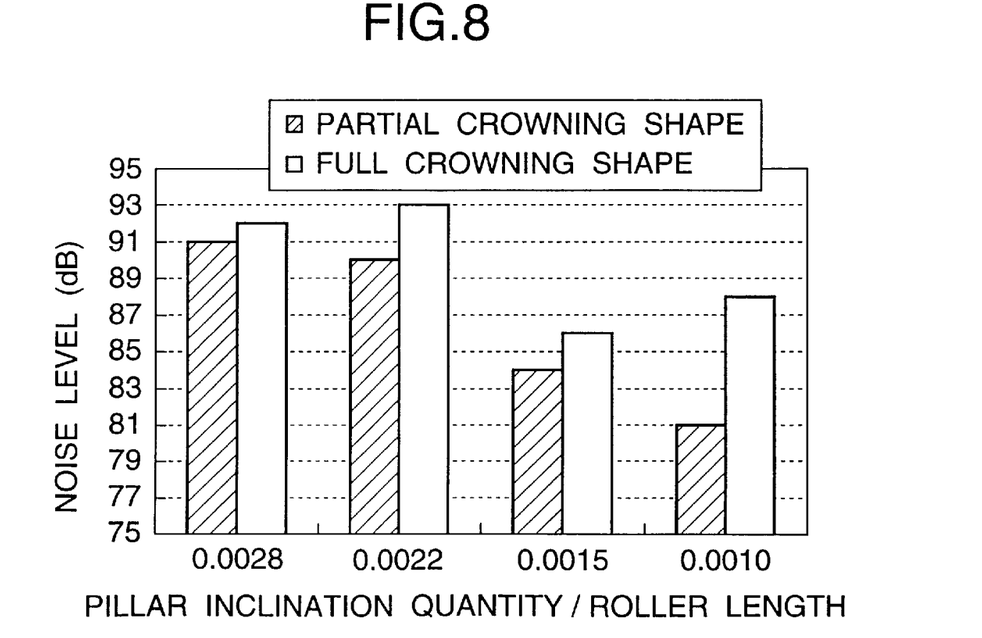
FIG. 8 is a graph showing the sound pressure level of the bearing based on the ratio of the inclination quantity of each pillar of the cage to the roller length in a second example.

Results of the test were shown in FIG. 8. The horizontal axis shows the ratios (Δr/L, Δθ/L) of the inclination quantities of each pillar 6 of the cage 3 to the roller length L. The vertical axis shows the averaged sound pressure level at the time of testing in comparison of the case where the roller type A was used with the case where the roller type B was used.

It is apparent from FIG. 8 that, in the case where the rollers 5 are of the A (partial crowning) shape type, the sound pressure level increases rapidly when the inclination quantity (Δr, Δθ) of each pillar 6 of the cage 3 is changed from 50 microns (Δr/L, Δθ/L≈0.0015) to 70 microns (Δr/L, Δθ/L≈0.0022).

On the other hand, in the case where the B (full crowning) shape type rollers 5 are assembled, the sound pressure level is not changed so much in accordance with the inclination quantity (Δr, Δθ) of each pillar 6 of the cage 3, that is, the sound pressure level is high even though the inclination quantity of the pillar 6 is small. Further, in the case where the B shape type rollers 5 are assembled, the sound pressure level at the time of testing largely fluctuated (not shown).

As described above, also in the relatively large-size cylindrical roller bearing in which rollers 5 each having a straight portion 5a at least in its rolling surface were assembled, it was confirmed that the level of sound pressure produced could be reduced in accordance with the inclination quantity (Δr, Δθ) of each pillar 6 of the cage 3. It is apparent from this test that the effect of reducing the sound pressure level can be obtained particularly when both the ratios (Δr/L, Δθ/L) of the inclination quantities (Δr, Δθ) of each pillar 6 of the cage to the roller length L are set to be equal to or less than about 0.0015.

Incidentally, the function, or the like, will be omitted because it can be considered that the function, or the like, is the same as in the test of the first example.

A third example will be described below.

The test of the third example was provided to confirm the effect in the case where each of rolling surfaces was linearly shaped over the whole length of the rolling surface in most effective combinations in the tests of the first and second examples.

That is, in a bearing of the first example in which each of rollers 5 had a partial crowning shape rolling surface and the inclination quantity (Δr, Δθ) of each pillar 6 of the cage 3 was equal to or less than about 10 microns, and in a bearing of the second example in which each of rollers 5 had a partial crowning shape rolling surface and the inclination quantity (Δr, Δθ) of each pillar 6 of the cage 3 was equal to or less than about 30 microns, the rollers 5 were exchanged to rollers 5 each having a rolling surface linearly shaped over the whole length of the rolling surface (referred to as full straight shape). Then, the test was performed. Incidentally, the same inner and outer races as those used in each test were assembled.

Figure 9:
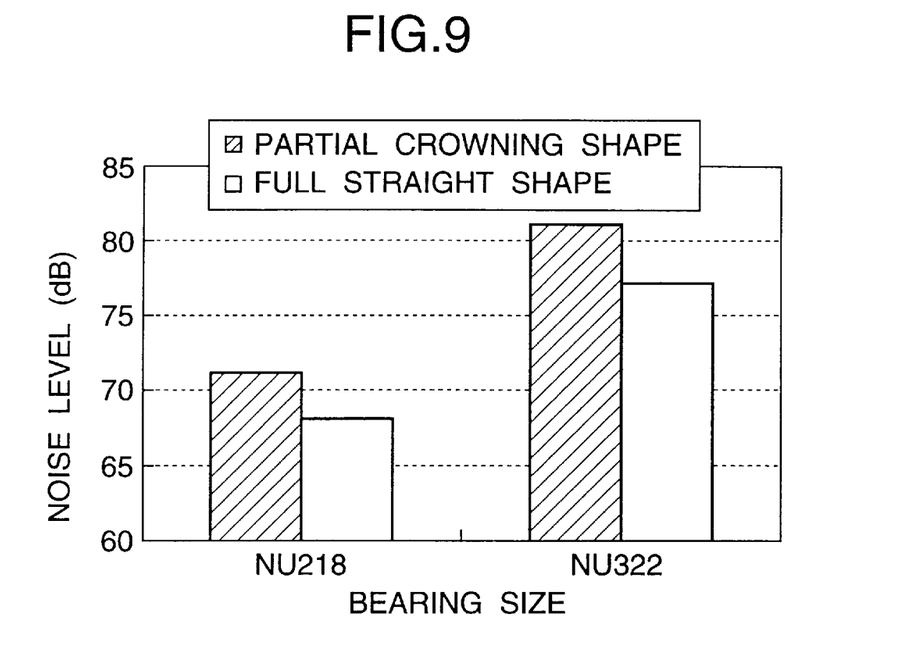
FIG. 9 is a graph for explaining the effect based on the difference in the length of the linear portion of the rolling surface of the roller.

FIG. 9 shows results of the test in comparison of the bearing using the full straight shape type rollers with the bearing using the partial crowning shape type rollers.

Incidentally, the test conditions and sound evaluation were set so as to be the same as those in the first and second examples.

It is apparent from FIG. 9 that, in each bearing, the sound pressure level in the case where the rolling surface of the roller 5 has a full straight shape is reduced by a degree of from about 3 dB to about 4 dB in comparison with that in the case where the rolling surface of the roller 5 has a partial crowning shape.

The reason for this can be considered as follows. In addition to the function (of obtaining secure guiding by the cage 3) in the tests of the first and second examples, the rollers can rotate on their own axes and can make revolution in a stabler posture, even against the influence of the lubricant (oil, grease, or the like) on each roller per se, because, for example, an oil film is apt to be formed evenly on each roller 5 in the axial direction so that the effect of suppressing the skew, or the like, is high.

It is apparent from the aforementioned results that the sound pressure level of the bearing is reduced more greatly when the linear portion is elongated so that a full straight shape is obtained in comparison with the case of the partial crowning shape.

A fourth example will be described below.

This example is provided for making evaluation of the influence of the viscosity of lubricating oil on the sound pressure level.

Under the following test condition, there were prepared a cage which was machined so that the quantity of falling of each pillar was about 10 $\mu$m (inclination: $0.5/1000$) according to the present invention, and a cage which was machined so that the quantity of falling of each pillar was about 40 $\mu$m (inclination: $20/1000$) out of the scope of the present invention. While other conditions were made common, the sound pressure level in each lubricating oil was measured.

Figure 13:
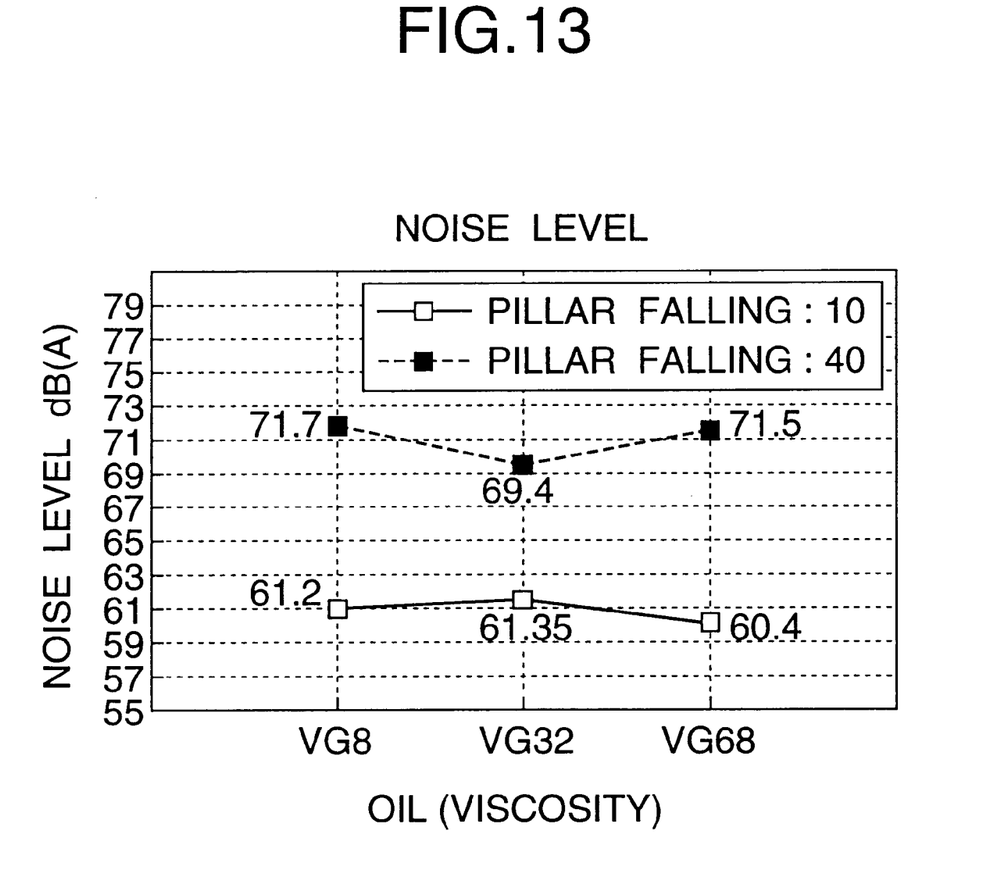
FIG. 13 is a view for explaining a fourth example.

FIG. 13 shows a result of the measurement.

The test condition was as follows. NU218 was used as the test bearing. A roller having a diameter of $\phi$19 mm and a length L of 20 mm was used as each roller 5 which was a rolling element. A partial crowning shape in which the axial center portion of the roller 5 was made a straight portion 5$a$ (about ½ as large as the roller length) and in which crowning was applied to each of opposite end sides 5$b$, was used as the shape of the rolling surface of the roller.

Further, the rotational speed of the bearing was set to be 1500 rpm and the radial load was set to be 150 Kgf.

It is apparent from this result that the noise reduction effect according to the present invention is not affected by the viscosity of lubricating oil. Further, it is apparent that the present invention in which the quantity of falling of each cage pillar is about 10 $\mu$m can attain noise reduction by a value of from about 9 dB to about 10 dB compared with the comparative example in which the quantity of falling of each cage pillar is about 40 $\mu$m.

Incidentally, though not shown, it is confirmed that the vibration level exhibits the same tendency as the sound pressure level, that is, lower vibration is obtained in the case where the quantity of falling of each cage pillar is about 10 $\mu$m.

According to the present invention, rollers guided by a cage in an unloading range can be kept rotating on their own axes respectively and making revolution stably. That is, these promote each roller used in a bearing to move in a geometrically ideal position. Accordingly, both the inclination (skew) of the roller with respect to the circumferential direction and the inclination (tilt) of the roller with respect to the radial direction can be suppressed.

Accordingly, there is an effect that both vibration and noise of the bearing caused by the change of the roller posture when the roller is rotating can be suppressed.

Here, according to the present invention, both increase of torque of the bearing and abnormal abrasion of the cage are prevented because the limitation by the cage is transmitted to the rollers securely and reasonably. Further, the present invention can be applied to bearing specifications widely because there is no limitation in accordance with the guiding method of the cage.

Particularly, by adjusting only the circumferential inclination of a portion of each pocket of the cage facing the roller in the circumferential direction to be equal to or less than $1.5/1000$ as large as the roller length, it is possible to obtain the same effect as described above. Particularly this invention is effective in the case where the contour of a portion facing the roller in the circumferential direction is linearly shaped along the radial direction.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

The entire disclosure of each and every foreign patent application from which the benefit of foreign priority has been claimed in the present application is incorporated herein by reference, as if fully set forth.

What is claimed is:

1. A cylindrical roller bearing comprising:
    a cage having pockets; and
    rollers received in said pockets, each of said rollers having a rolling surface, a contour of the rolling surface along a direction of an axis of said roller having at least a center portion linearly shaped in parallel with the axis,
    wherein each of said pockets is formed so that an inclination of a portion of said pocket opposite to the rolling surface of said roller with respect to a line parallel with a center axis of rotation of the bearing is set to be equal to or less than $1.5/1000$ as large as a length of said roller.

2. A cylindrical roller bearing comprising:
    a cage having pockets; and
    rollers received in said pockets, each of said rollers having a rolling surface, a contour of said rolling surface along a direction of an axis of said roller having at least a center portion linearly shaped in parallel with the axis,
    wherein each of said pockets is formed so that an inclination of a portion of said pocket opposite to said roller in a circumferential direction is set to be equal to or less than $1.5/1000$ as large as a length of said roller.

3. A cylindrical roller bearing comprising:
    a cage having pockets; and
    rollers received in said pockets, each of said rollers having a rolling surface, a contour of said rolling surface along a direction of an axis of said roller having at least a center portion linearly shaped in parallel with the axis,
    wherein a portion of said pocket faces said roller in a circumferential direction, and each of said pockets is formed so that inclinations of the portion of said pocket in the circumferential direction and in a radial direction is set to be equal to or less than $1.5/1000$ as large as a length of said roller.

\* \* \* \* \*